US008284826B2

(12) United States Patent
Schiff et al.

(10) Patent No.: US 8,284,826 B2

(45) Date of Patent: Oct. 9, 2012

(54) SYNCHRONIZATION OF SATELLITE AND TERRESTRIAL BROADCAST ODFM SIGNALS

(75) Inventors: Leonard N. Schiff, San Diego, CA (US); William G. Ames, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 880 days.

(21) Appl. No.: 11/934,684

(22) Filed: Nov. 2, 2007

(65) Prior Publication Data

US 2009/0116543 A1 May 7, 2009

(51) Int. Cl.
*H04B 3/46* (2006.01)

(52) U.S. Cl. ........ 375/227; 375/354; 375/293; 375/364; 370/210; 370/314

(58) Field of Classification Search .................. 375/227
See application file for complete search history.

(56) References Cited

U.S. PATENT DOCUMENTS

| | | | | |
|---|---|---|---|---|
| 6,125,150 | A * | 9/2000 | Wesel et al. | 375/265 |
| 6,956,814 | B1 * | 10/2005 | Campanella | 370/210 |
| 7,308,229 | B2 * | 12/2007 | Hane et al. | 455/3.02 |
| 2007/0177492 | A1 | 8/2007 | Walker | |
| 2007/0184862 | A1 | 8/2007 | Hartless | |

FOREIGN PATENT DOCUMENTS

EP 1819067 8/2007

OTHER PUBLICATIONS

International Search Report—PCT/US08/082172, International Search Authority—European Patent Office—Feb. 18, 2009.

Written Opinion—PCT/US08/082172, International Search Authority—European Patent Office—Feb. 18, 2009.

* cited by examiner

*Primary Examiner* — Lihong Yu

(74) *Attorney, Agent, or Firm* — Jeffrey D. Jacobs

(57) ABSTRACT

Synchronization of satellite and terrestrial broadcasts in a shared frequency arrangement is use in order to facilitate simultaneous reception of the broadcasts. A delay value is adjusted based on a synchronization between a first terrestrial broadcast and a satellite broadcast, and a delay value for a second terrestrial broadcast is adjusted based on a synchronization between the second terrestrial broadcast, the first terrestrial broadcast and the satellite broadcast. The adjustment of the relative delay values provides an improved reception pattern based on receipt of a shared frequency communication from multiple sources by improving a signal quality factor within at least selected regions of the coverage areas in which the relative delay values permit synchronization. This allows for synchronization lock between multiple substantially simultaneous broadcasts as determined by a cyclic prefix window of the broadcasts in overlapping coverage areas, useful for simultaneous satellite and terrestrial broadcasts using an OFDM format.

16 Claims, 4 Drawing Sheets

SYNCHRONIZATION OF SATELLITE AND TERRESTRIAL BROADCAST ODFM SIGNALS

BACKGROUND

I. Field

The present invention relates generally to telecommunications and shared frequency broadcasting, such as used in terrestrial digital multimedia/television broadcasting systems.

II. Background

Typical broadcast distribution systems include terrestrial, satellite, cable, microwave and other transmission, for data broadcasting, Internet and other wideband multimedia information transmission, and for integrated data service applications.

Terrestrial broadcasts have an advantage of strong signals within a localized area. A disadvantage is that terrestrial broadcasts have substantial signal attenuation as a result of line-of-sight limitations. Satellite broadcasts, on the other hand, provide good area coverage, but have limited power. In many cases, overhead obstructions, such as buildings, trees, etc. limit satellite reception. In the case of reception under varying conditions, such as by a mobile wireless communication device (WCD), either satellite or terrestrial broadcasts can provide the best coverage, depending on the particular circumstances at any given time.

A wireless communication device (WCD) includes but is not limited to a user equipment, station (STA), mobile station, fixed or mobile subscriber unit, pager, or any other type of device capable of operating in a wireless environment. When referred to hereafter, an access point (AP) includes but is not limited to a base station, Node-B, site controller, WLAN access point or any other type of interfacing device in a wireless environment.

OFDM

OFDM (orthogonal frequency division multiplexing) is a multi-carrier modulation technique that effectively partitions the overall system bandwidth into multiple (N) orthogonal frequency subbands. These subbands are also referred to as tones, sub-carriers, bins, and frequency channels. With OFDM, each subband is associated with a respective sub-carrier that may be modulated with data.

In an OFDM system, a transmitter processes data to obtain modulation symbols, and further performs OFDM modulation on the modulation symbols to generate OFDM symbols, as described below. The transmitter then conditions and transmits the OFDM symbols via a communication channel. The OFDM system may use a transmission structure whereby data is transmitted in symbols or groups of symbols, with each symbol transmission having a particular time duration. The symbol transmission generally includes a cyclic prefix. The receiver typically needs to obtain accurate symbol timing in order to properly recover the data sent by the transmitter. For example, the receiver may need to know the timing of each symbol transmission in order to properly recover the data sent in the symbol transmission. The receiver often does not know the time at which each OFDM symbol is sent by the transmitter nor the propagation delay introduced by the communication channel. The receiver would then need to ascertain the timing of each OFDM symbol received via the communication channel in order to properly perform the complementary OFDM demodulation on the received OFDM symbol. There are various techniques used for accommodating variations in timing, including the use of the cyclic prefix, training symbols and other techniques. This provides a tolerance for synchronization errors; however the ability of a receiver to accommodate lack of synchronization is limited.

Satellite Broadcasts

FIG. 1 is a diagram depicting the propagation delay effects of a satellite broadcast implemented from a geosynchronous orbit. The satellite itself is 35,786 km above mean sea level; however the distance to any point on the earth is greater according to the distance of that point from the orbital track of the satellite. The propagation delay is represented by arcs 111-119, so that, for example, a receiver near arc 111 would be subject to less delay than a receiver near arc 118. The change in propagation delay is continuous with distance from the satellite's sub-satellite point, so arcs 111-119 are not defined incremental boundaries. This change in propagation distance generally is greatest in the north-south direction, with a declination corresponding to the orbital position of the satellite.

One aspect of shared frequency broadcasting using multiple sources is that the relative delay in receipt of the signals varies according to the position of the receiver with respect to the multiple sources. If the multiple sources are equidistant from the receiver, then signals transmitted at the same time will be synchronized. If the receiver is closer to one transmitter, then the propagation delays will differ. In the case of satellite transmissions, there is a significant propagation delay. In the case of geosynchronous satellites, the radio propagation delay corresponds to 35,786 km above mean sea level plus the skew distance to the receiver established by the geographical latitude of the receiver.

If a signal is to be simultaneously received from both a terrestrial station and a satellite, the transmission of the terrestrial station must be delayed with respect to that of the satellite. This delay changes in accordance with the angle of inclination of the signal, which roughly corresponds to the latitude of the receiver. This delay can be adjusted, and a receiver on the ground can continue to receive both a terrestrial signal and a satellite signal substantially simultaneously, provided that the signal times fall close to being within the time window defined by the cyclic prefix window. It is desirable that the signal times fall within the time window defined by the cyclic prefix window or reasonably close to that time window because this reduces interference. If the signal times fall within the time window defined by the cyclic prefix window, the received signals exhibit a low amount of interference. It is possible to exceed the time window defined by the cyclic prefix by a small amount. Exceeding the time window can result in interference; however, a small amount of interference is deemed acceptable because it does not substantially degrade the received signals.

In the case of terrestrial broadcasts, adjacent stations can have their signals synchronized, or alternatively skewed, in a manner to optimize reception from the multiple terrestrial stations. This is particularly advantageous in regions within the coverage areas where signal strength or signal quality are weakest. The areas covered by satellite broadcasts, on the other hand, generally do not correspond to the terrestrial broadcast areas. As a result, the propagation delay of a satellite transmission when taken at different locations across a given terrestrial broadcast area will vary. The delays in the satellite transmission when taken at different locations across multiple terrestrial broadcast areas will vary to a significantly greater degree, particularly along a generally north-south direction. For this reason, setting synchronization between terrestrial stations in a conventional fashion results in the terrestrial stations being out of sync with the satellite or inoptimally synchronized with the satellite.

SUMMARY

Synchronization for single broadcasts transmitted from satellite and terrestrial broadcasts is performed by establishing a delay value for a first terrestrial broadcast and adjusting the delay value based on a synchronization between the first terrestrial broadcast and a satellite broadcast. In one configuration, a delay value is adjusted for additional terrestrial broadcasts based on a synchronization between the second terrestrial broadcast, the first terrestrial broadcast and the satellite broadcast.

In a particular configuration, a broadcast area of the first terrestrial broadcast and an additional terrestrial broadcast is determined. The delay value is adjusted based on the synchronization between the first terrestrial broadcast and the satellite broadcast for a coverage area of the first terrestrial broadcast and the additional terrestrial broadcast. A delay value is adjusted based on the synchronization for said coverage area between the additional terrestrial broadcast and the satellite broadcast. The relative delay values between the first terrestrial broadcasts are adjusted based on synchronization between the terrestrial broadcasts and the satellite broadcast in order to obtain an improved reception pattern based on receipt of a shared frequency communication from multiple sources. The improvement is determined by improving a signal quality factor within at least selected regions of the coverage areas in which the relative delay values permit synchronization lock. The signal quality factor a quality measurement may be one of a Signal to Interference plus Noise Ratio (SINR), a Signal to Interference Ratio (SIR), or a Signal to Noise Ratio (SNR). The adjustment of the relative delay values may be performed by selecting coverage areas according to actual or anticipated signal strength of terrestrial broadcast signals and effecting said adjustments in the relative delay values in order to achieve the improved reception pattern within the selected areas.

In one configuration, delay values are adjusted within a cyclic prefix window of the broadcasts in overlapping coverage areas. Adjusting of the relative delay values provides an optimization of the performance of the combined terrestrial and satellite communication system.

In another configuration, a terrestrial station comprises a delay circuit and a delay adjustment circuit. The delay adjustment circuit is capable of establishing a delay value and adjusting the delay value by synchronization for single broadcasts transmitted from satellite and terrestrial broadcasts, in which a delay value for a first terrestrial broadcast is determined and adjusted based on a synchronization between the first terrestrial broadcast and a satellite broadcast.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Overview

Figure 1:
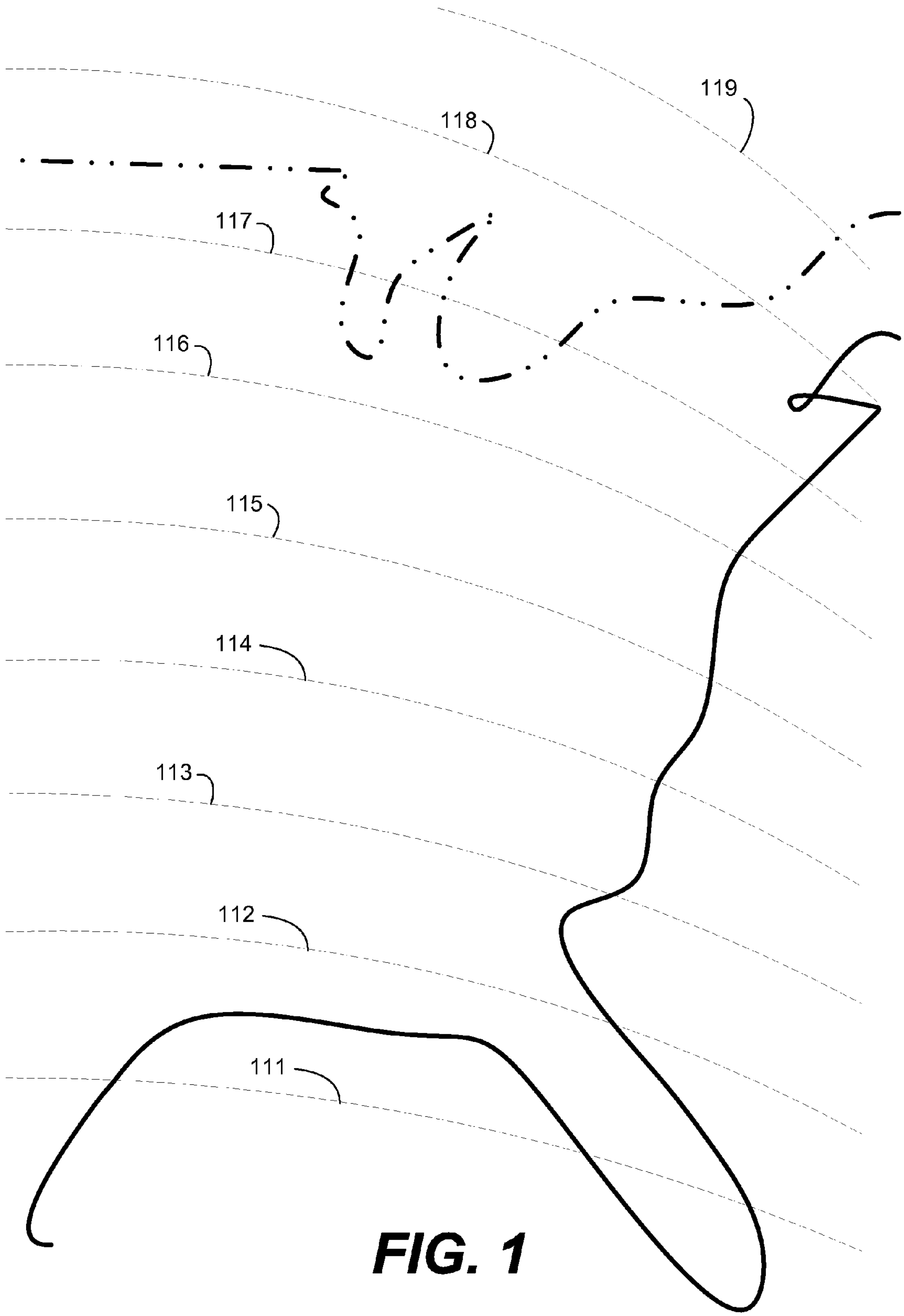
FIG. 1 is a diagram depicting the propagation delay effects of a satellite broadcast implemented from a geosynchronous orbit.
Figure 2:
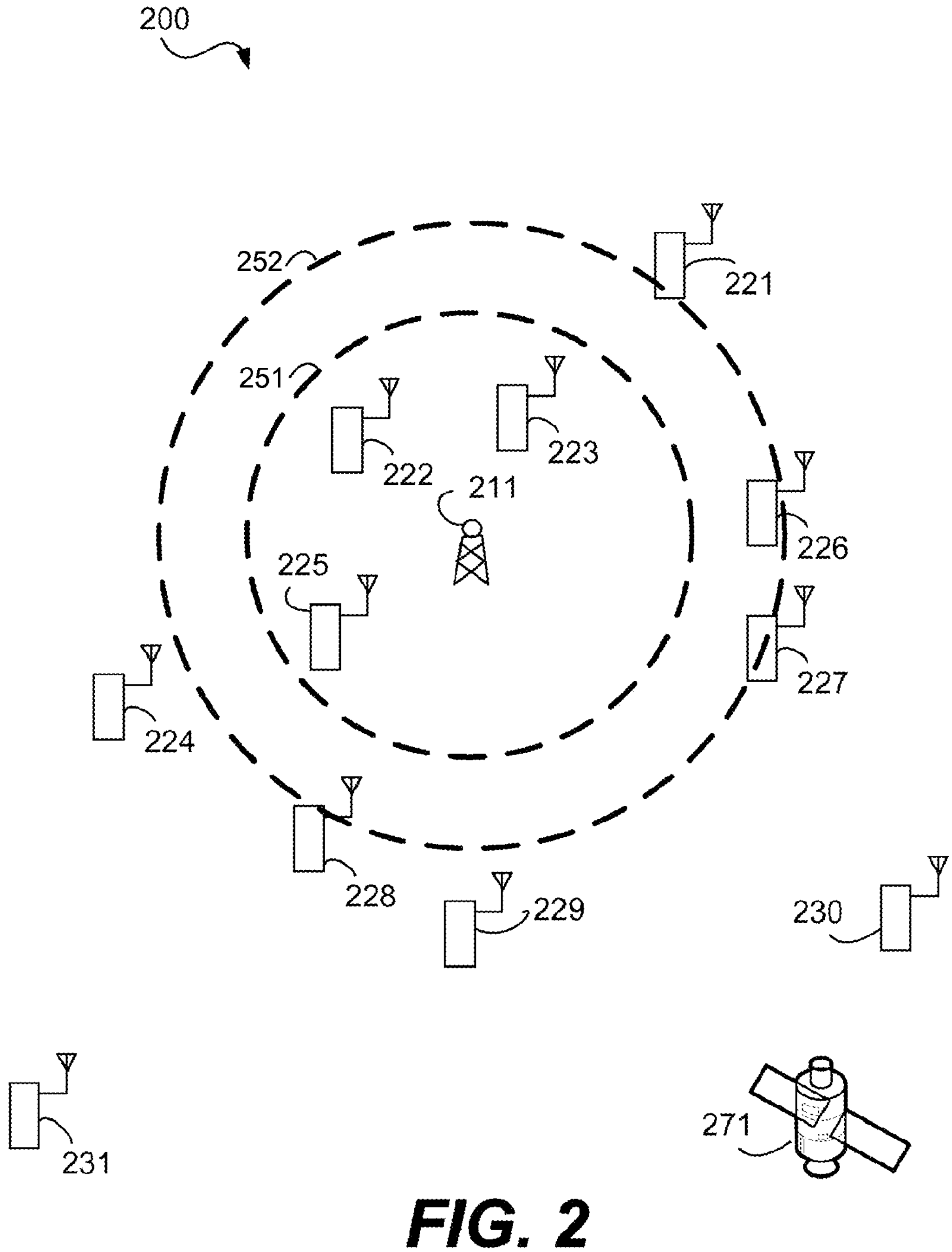
FIG. 2 is a diagram showing a region in which a terrestrial broadcast is implemented with a single terrestrial station in the depicted region.

FIG. 2 is a diagram showing a region 200 in which a terrestrial broadcast is implemented with a single terrestrial station 211 in the depicted region 201. A plurality of WCDs 221, 222, 223, 224, 225, 226, 227, 228, 229, 230, 231 are at various locations in the region 201. For convenience of explanation, the locations of the WCDs 221-231 are referenced to the antennas. The ability to receive signals from the broadcast station 211 is of course dependent on the distance of the individual WCD from the station 211, as well as other characteristics of the signal propagation environment. If the area depicted by dashed line 251 is presumed to be a strong coverage area and the area depicted by dashed line 252 is presumed to be a weaker coverage area, then WCDs 222-224 would have good reception, and WCD 228 would be in a reception area with weaker reception. WCDs 221, 224, 226, 227 and 229 would be outside the weaker coverage area 252 and would be less likely to receive enough signal to have an acceptable quality of service (QoS). WCDs 230 and 231 are probably unable to obtain sufficient signals from station 211 to achieve service absent further augmentation.

The circles 251, 252 depicting the coverage area are presented for simplicity; however the actual reception is varied as a result of geography and physical culture such as buildings, and can also be varied in shape according to antenna design. Significantly, circles 251, 252 do not represent defined boundaries, except that signal strength diminishes with distance from the transmitter.

FIG. 2 is a diagram showing a region 200 in which a terrestrial broadcast is implemented with a single terrestrial station 211 in the depicted region 200. A plurality of WCDs 221, 222, 223, 224, 225, 226, 227, 228, 229, 230, 231 are at various locations in the region 200. For convenience of explanation, the locations of the WCDs 221-231 are referenced to the antennas. The ability to receive signals from the broadcast station 211 is of course dependent on the distance of the individual WCD from the station 211, as well as other characteristics of the signal propagation environment. If the area depicted by dashed line 251 is presumed to be a strong coverage area and the area depicted by dashed line 252 is presumed to be a weaker coverage area, then WCDs 222, 223, and 225 would have good reception, and WCD 228 would be in a reception area with weaker reception. WCDs 221, 224, 226, 227 and 229 would be outside the weaker coverage area 252 and would be less likely to receive enough signal to have an acceptable quality of service (QoS). WCDs 230 and 231 are probably unable to obtain sufficient signals from station 211 to achieve service absent further augmentation.

By setting delay between the terrestrial station 211 and the satellite 271, it is possible to use shared frequency techniques such as provided by OFDM standards to combine the signals from the terrestrial station 211 and the satellite 271. This would benefit reception for WCDs 222-224, for example where urban obstructions make terrestrial broadcast reception difficult. This would also enhance reception for WCD

228 as well as WCDs 222-224 by augmenting the signals received. In addition, to the extent that WCDs 221, 224, 226, 227 and 229 are able to receive signals from terrestrial station 211, the satellite and terrestrial signals would augment each other. Additionally, WCDs 230 and 231, while outside of the coverage area of station 211, may be able to receive sufficient signals from station 211 to augment the satellite broadcast.

The signal synchronization between satellite 271 and terrestrial station 211 comprises selecting a center point relative to synchronization according to the distance to which the simultaneous reception is functional. Simultaneous reception is achieved by the signals simultaneously received falling within a time window defined by the cyclic prefix window. For this reason, the adjustment is such that the signals are received within the cyclic prefix window. This signal synchronization is adjusted to achieve a desired timing relationship in areas where a combination of signals from the terrestrial station 211 and the satellite 271 are most advantageous. In the case of the coverage area represented in FIG. 2, the synchronization involves one ground station 211 in the sense that an interaction between ground stations is not considered significant.

Figure 3:
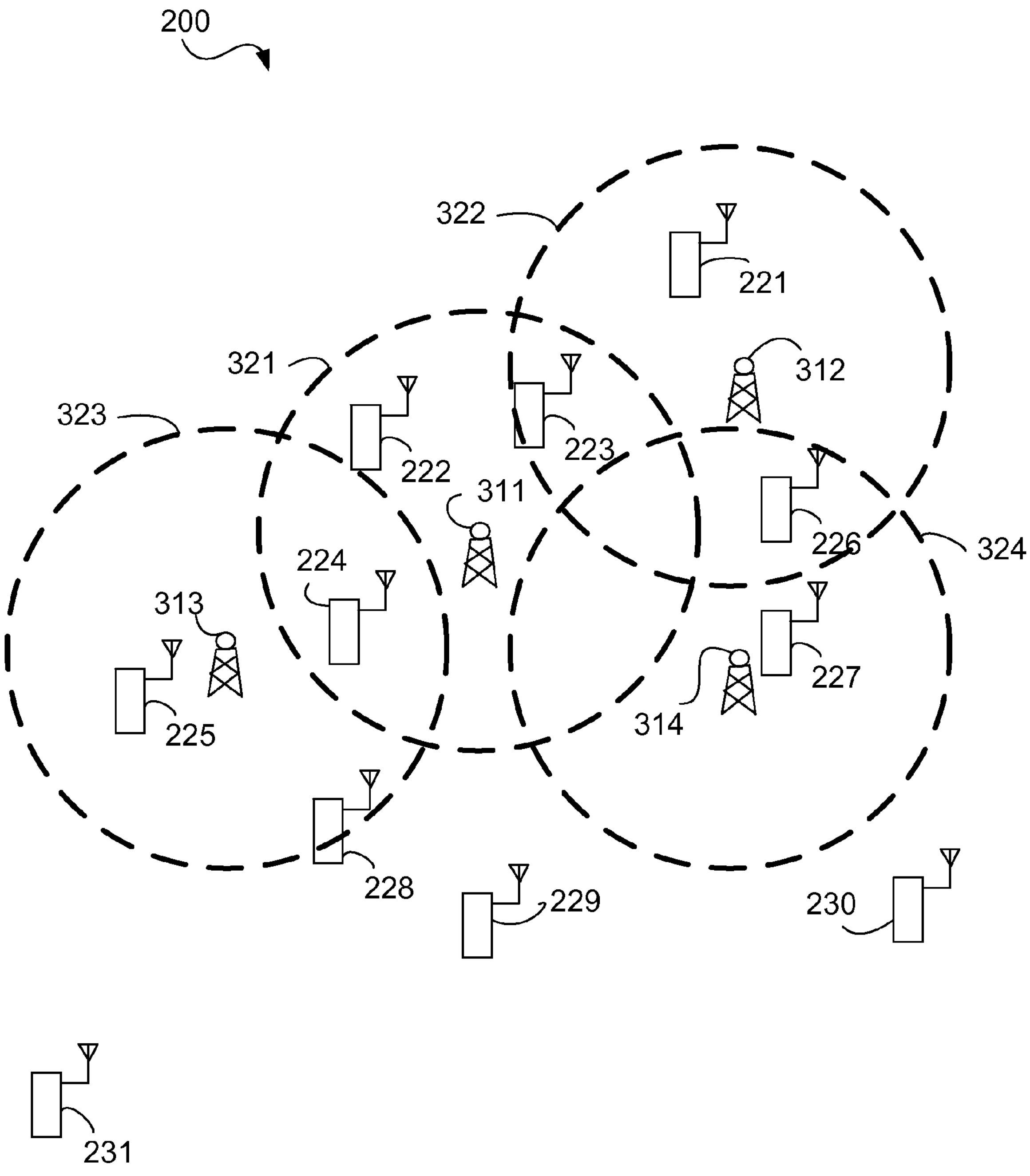
FIG. 3 is a diagram showing region, in which a plurality of terrestrial stations are used to provide coverage in local terrestrial reception areas.

FIG. 3 is a diagram showing region 200, in which a plurality of terrestrial stations 311, 312, 313, 314 are used to provide coverage in local terrestrial reception areas represented schematically by circles 321, 322, 323, 324. The reception areas 321-324 correspond to broadcast stations 311-314. The circles depicting the reception areas 321-324 are presented for simplicity; however the actual reception is varied as a result of geography and physical culture (buildings), and can also be varied in shape according to antenna design. Significantly, the circles 321-322 do not represent defined boundaries, except that signal strength diminishes with distance from the transmitter. In a shared frequency multiple broadcast OFDM environment, the boundaries (circles 321-322) are even less defined because reception can be significantly enhanced by combining reception from multiple sources.

Still referring to FIG. 3, WCDs 221-231 are depicted at the various locations, with the locations of the WCDs 221-231 referenced by the positions of the antennas. In the diagram, WCDs 221, 222, 225, 227, 228 are within a single one of the reception areas depicted by circles 321-322. WCD 223 is within multiple ones of reception areas, depicted by circles 321, 322. WCD 224 is within multiple ones of reception areas, depicted by circles 321, 323. WCD 226 is within multiple reception areas depicted by circles 322, 324. WCDs 229, 230 and 231 are outside of the boundaries indicated by circles 321-322.

The relative signal strength of each of the reception areas had not been specifically defined. If the signal strengths within circles 321-324 are sufficient for reception from a single station, then any WCD 221-228 within any of circles 321-324 would theoretically have sufficient signal strength for proper reception. The terminology “theoretically” is used because as mentioned above, there are variations caused by the physical environment. In a shared frequency multiple broadcast OFDM environment, reception would also be available outside of the circles 321-324 if the WCD is sufficiently close to multiple stations. In FIG. 3, this would apply to WCD 229, which is near stations 311, 313 and 314, but is not within any of circles 321, 323, 324. WCDs 230 and 231 would be less likely to benefit from proximity to multiple stations. In the case of WCD 230, this is a result of WCD 230 being outside of its nearest reception area 324 and much further from the next nearest reception areas 321-323. Similarly, in the case of WCD 231, this is a result of WCD 231 being outside of its nearest reception area 323 and much further from reception areas 321, 322, 324. In order for WCDs 230, 231 to obtain reception, the signals from stations 321-324 must be sufficient to allow the WCD to process the combined signals according to the shared frequency multiple broadcast OFDM configuration.

It is alternatively possible to define circles 321-324 as having less than a minimum signal strength for reception from a single station. In that case, WCD 224 would have good reception because it is near station 313, but WCD 228 would have poor reception because it is on the outer fringe. WCD 223 would be on the outer fringes of areas 321 and 322 but would benefit from multiple broadcasts from a combination of stations 321, 322. The terrestrial reception from multiple stations 321, 322 would be sufficient to provide good reception. In either case, the reception by any of the WCDs 221-231 is dependent on the distance from the stations 311-324 and the ability of the WCDs 221-231 to combine signals from multiple stations 311-324 in a shared frequency multiple broadcast OFDM environment.

In general, without the satellite synchronization issue, it would be desirable to have the base stations to be synchronized in most instances. An exception to this is, for example, the case in which a cell has better propagation conditions. In that case, its signal may penetrate other cells further. Such a cell may have an earlier start time than its neighbor cells. The adjustment of satellite synchronization would overlay such an adjustment of the synchronization of cells based on propagation conditions.

Figure 4:
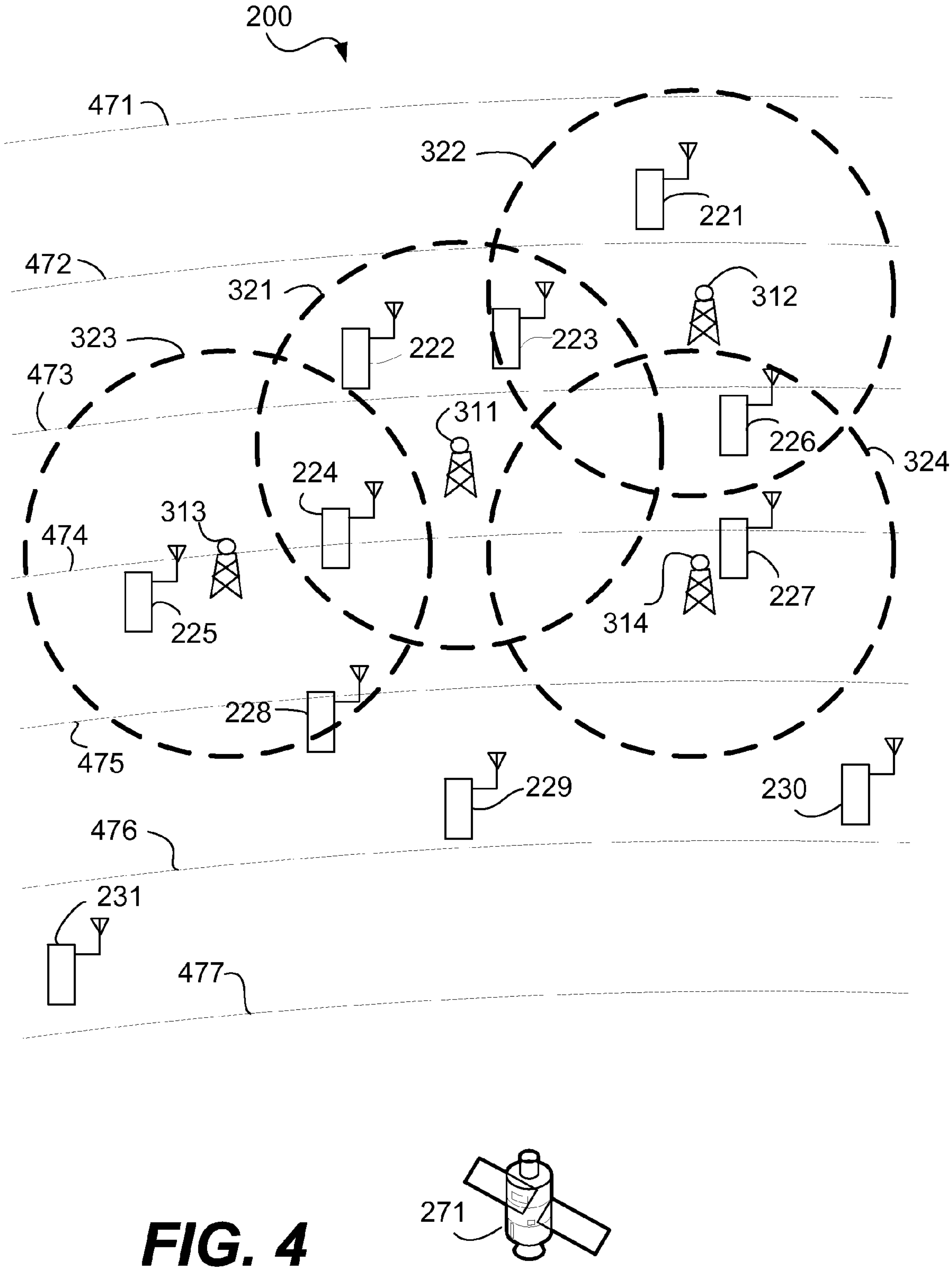
FIG. 4 is a diagram showing the environment of FIG. 3, with the superposition of satellite broadcast areas represented according to a propagation time delay.

FIG. 4 is a diagram showing the environment of FIG. 3, but with the superposition of satellite broadcast delay contours 471, 472, 473, 474, 475, 476, 477. The satellite (e.g., satellite 271 as represented in FIG. 2) can be used to augment terrestrial signals from terrestrial stations 311-314. Reception by WCDs 211-231 depends on the availability of either a signal from the satellite, from terrestrial stations 311-314 or any combination of the satellite and terrestrial stations. In order for the combination to work, the signals must be substantially simultaneously received. As in the case of a single terrestrial broadcast station (211, FIG. 2), simultaneous reception of satellite signals and terrestrial signals is such that the signals are received within a time window defined by the cyclic prefix window.

The satellite transmission is represented by the delay contours 471-477 in order to graphically depict a time lag resulting from signal propagation of the satellite signal, however the change in signal propagation is continuous. The delay contours 471-477 are models representing the relative time delays for satellite transmission resulting from propagation delay.

Still referring to FIG. 4, if the satellite transmission is integrated with transmissions from the terrestrial stations 311-314, then WCDs 229-231 would be in at least the satellite reception area generally represented by delay contours 475, 476. Looking at WCD 230, it is likely that it can also receive signals from terrestrial station 314, in which case, WCD 230's reception is a combination of signals from the satellite (indicated at delay contour 475) and terrestrial station 314. Similarly, WCD 229, is likely to receive signals from terrestrial stations 311, 313 and 314, in combination with signals from the satellite approximately half-way between delay contours 475 and 476.

WCD 228 is depicted within a coverage area 323 of terrestrial station 313, but near the fringe of coverage area 323. If WCD 323 is able to receive signals from the satellite, the reception by WCD 228 would be a combination of signals from terrestrial station 313 and signals from the satellite (indicated at delay contour 475). WCD 223 is likely able to receive a combination of signals from two terrestrial stations 311, 312 and signals from the satellite (indicated at delay contours 472 and 473).

WCD 225 is able to receive a combination of signals from the satellite and terrestrial station 313; however the close proximity of WCD 225 to station 313 means that in most instances, the reception from station 313 alone will provide approximately the same quality of service (QoS) as a combination of signals from terrestrial station 313 and signals from the satellite at delay contour 474. When configuring the signals, the reception of WCD 225 would not be a significant factor because it is likely that WCD 225 will generally have good QoS. Regardless, to the extent that the signals from the satellite and terrestrial station 313 fall within the cyclic prefix window, WCD 225 is more able to overcome signal fading and other effects on the signal from terrestrial station 313.

WCD 228 is depicted within a coverage area 323 of terrestrial station 313, but near the fringe of coverage area 323. If WCD 228 is able to receive signals from the satellite, the reception by WCD 228 would be a combination of signals from terrestrial station 313 and signals from the satellite (indicated at delay contour 475). WCD 223 is likely able to receive a combination of signals from two terrestrial stations 311, 312 and signals from the satellite (indicated at delay contours 472 and 473).

If the combined system is to be matched to provide a favorable timing relationship between the different transmission sources, then accommodation is made for the propagation delay differences with terrestrial stations 311-315 according to delay contours 471-477. This can conflict with the best timing relationship between terrestrial stations 311-315, so the ideal timing relationship is not necessarily that of a match between the propagation delays at delay contours 471-477 and is not that of full synchronization of terrestrial stations 311-315.

When configuring the terrestrial stations 311-314 without consideration of satellite broadcasts, it is possible to set the timing difference between transmissions so that signals from the different stations 311-314 are best received in the fringe areas. If a WCD is equidistant to two stations, then the received signals would be timed so that there is no time shift between the two stations. This is not true in the case of satellite broadcasts combined with terrestrial stations because the propagation delay follows a different pattern. Referring to FIG. 4, signals within the different areas represented by delay contours 471-477 experience different signal delays even though they have a common origin at the satellite. As mentioned, this delay change is continuous; the delay contours 471-477 being provided for simplicity of depiction. The delay value is determined by adjusting the delay for achieving the optimum coverage based on a signal quality factor. The signal quality value factor is determined by a signal quality measurement such as signal to interference plus noise ratio (SINR). Different approaches may be used in determining the signal quality, so the a quality measurement may be selected from one at least one of a SINR, a signal to interference ratio (SIR), or a signal to noise ratio (SNR).

If the combined system is to be matched to provide a favorable timing relationship between the different transmission sources, then accommodation is made for the propagation delay differences with terrestrial stations 311-314 according to delay contours 471-477. This can conflict with the best timing relationship between terrestrial stations 311-314, so the ideal timing relationship is not necessarily that of a match between the propagation delays at delay contours 471-477 and is not that of full synchronization of terrestrial stations 311-314.

CONCLUSION

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, microprocessor, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a microprocessor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable a person skilled in the art to make or use the present invention. Various modifications to these embodiments will be readily apparent to those skilled in the art, and the generic principles defined herein may be applied as will be apparent to those skilled in the art. For example, one or more elements can be rearranged and/or combined, or additional elements may be added. Thus, the present invention is not intended to be limited to the embodiments shown herein but is to be accorded the widest scope consistent with the principles and novel features disclosed herein.

The techniques and modules described herein may be implemented by various means. For example, these techniques may be implemented in hardware, software, or a combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors or demodulators. The memory unit may be implemented within the processor or external to the processor, in which case it can be communicatively coupled to the processor via various means.

The previous description of the disclosed embodiments is provided to enable any person skilled in the art to make or use the features, functions, operations, and embodiments disclosed herein. Various modifications to these embodiments may be readily apparent to those skilled in the art, and the generic principles defined herein may be applied to other embodiments without departing from their spirit or scope. Thus, the present disclosure is not intended to be limited to the embodiments shown herein but is to be accorded the widest scope consistent with the principles and novel features disclosed herein.

What is claimed is:

1. A method for synchronizing common broadcasts from multiple transmitters, the method comprising:

establishing a first delay value for a first terrestrial broadcast signal transmitted from a first terrestrial transmitter based upon a propagation delay of a satellite broadcast signal on a shared frequency between the first terrestrial transmitter and a broadcast satellite;

measuring a signal quality factor to identify a region within a coverage area of the first terrestrial transmitter where a combination of signals from the first terrestrial transmitter and the broadcast satellite is most advantageous; and adjusting the first delay value of the first terrestrial broadcast signal based on the measured signal quality factor within the identified region of the coverage area, wherein delaying transmissions of the terrestrial broadcast signal from the first terrestrial transmitter by the first delay value allows a wireless communication device receiving the first terrestrial broadcast signal and the satellite broadcast signal to combine the first terrestrial broadcast signal and the satellite broadcast signal to obtain an enhanced shared frequency received signal within the identified region of the coverage area.

2. The method of claim 1, further comprising:

establishing a second delay value for a second terrestrial broadcast signal transmitted from a second terrestrial transmitter based upon a propagation delay of the satellite broadcast signal on the shared frequency between the second terrestrial transmitter and a broadcast satellite;

adjusting the second delay value for the second terrestrial broadcast signal based on a synchronization between the second terrestrial broadcast signal, the first terrestrial broadcast signal and the satellite broadcast signal.

3. The method of claim 1, further comprising:

establishing a second delay value for a second terrestrial broadcast signal transmitted from a second terrestrial transmitter based upon a propagation delay of the satellite broadcast signal on the shared frequency between the second terrestrial transmitter and a broadcast satellite;

adjusting the second delay value for the second terrestrial broadcast signal based on a synchronization between the second terrestrial broadcast signal and the satellite broadcast signal; and adjusting the first and second delay values based on the measured signal quality factor and a synchronization between the first terrestrial broadcast signal, the second terrestrial broadcast signal and the satellite broadcast signal, wherein delaying transmissions of the first and second terrestrial broadcast signals by the first and second delay values, respectively, allows the wireless communication device receiving the first terrestrial broadcast signal, the second terrestrial broadcast signal and the satellite broadcast signal to combine the first terrestrial broadcast signal, the second terrestrial broadcast signal, and the satellite broadcast signal to obtain an enhanced shared frequency received signal.

4. The method of claim 1, wherein measuring a signal quality factor to identify a region within a coverage area of the first terrestrial transmitter where a combination of signals from the first terrestrial transmitter and the broadcast satellite is most advantageous comprises measuring at least one quality measurement selected from a Signal to Interference plus Noise Ratio (SINR), a Signal to Interference Ratio (SIR), and a Signal to Noise Ratio (SNR).

5. The method of claim 4, wherein:

the identified region of the coverage area comprises an area in which the first delay value permits synchronization lock by wireless communication devices of both the first terrestrial broadcast signal and the satellite broadcast signal.

6. The method of claim 2, wherein adjusting the second delay value for the second terrestrial broadcast signal based on a synchronization between the second terrestrial broadcast signal, the first terrestrial broadcast signal and the satellite broadcast signal comprises adjusting the second delay value by performing an optimization calculation of the second delay value for the second terrestrial broadcast signal based on a synchronization between the second terrestrial broadcast signal, the first terrestrial broadcast signal and the satellite broadcast signal.

7. The method of claim 1, wherein measuring a signal quality factor to identify a region within a coverage area of the first terrestrial transmitter where a combination of signals from the first terrestrial transmitter and the broadcast satellite is most advantageous comprises identifying portions of the coverage area of the first terrestrial transmitter having the least signal power or signal quality.

8. A terrestrial station capable of providing transmissions for simultaneous reception from said terrestrial station and a satellite, the terrestrial station comprising:

a transmitter configured to transmit a first terrestrial broadcast signal;

means for establishing a first delay value for the first terrestrial broadcast signal transmitted from the terrestrial station transmitter based upon anticipated propagation of signals from the first terrestrial broadcast signal and a satellite broadcast signal on a shared frequency; and means for adjusting the first delay value based on a measured signal quality factor within a region of coverage area of the transmitter that is selected by measuring a signal quality factor to identify a region where a combination of signals from the transmitter and the broadcast satellite is most advantageous wherein delaying transmissions of the terrestrial broadcast signal from the transmitter by the first delay value allows a wireless communication device receiving the first terrestrial broadcast signal and the satellite broadcast signal to combine the first terrestrial broadcast signal and the satellite broadcast signal to obtain an enhanced shared frequency received signal within the selected region of the coverage area.

9. The terrestrial station of claim 8, wherein the measured signal quality factor is at least one quality measurement selected from a Signal to Interference plus Noise Ratio (SINR), a Signal to Interference Ratio (SIR), and a Signal to Noise Ratio (SNR).

10. A communication system capable of providing enhanced performance of a combined terrestrial and satellite shared frequency communication comprising:

a first terrestrial transmitter;

a second terrestrial transmitter;

a broadcast satellite configured to transmit a satellite broadcast signal, means for establishing a first delay value for a first terrestrial broadcast signal transmitted from the first terrestrial transmitter based upon a propagation delay of a satellite broadcast signal on a shared frequency between the first terrestrial transmitter and the broadcast satellite;

means for establishing a second delay value for a second terrestrial broadcast signal transmitted from the second terrestrial transmitter based upon a propagation delay of the satellite broadcast signal on the shared frequency between the second terrestrial transmitter and the broadcast satellite;

means for adjusting the first delay value of the first terrestrial broadcast signal based on a measured signal quality factor measured within a region of coverage area of the first terrestrial transmitter selected by measuring the signal quality factor to identify a region within a coverage area of the first terrestrial transmitter where a combination of signals from the first terrestrial transmitter and the satellite broadcast signal is most advantageous; and means for adjusting the second delay value based on a synchronization between the first terrestrial broadcast signal, the second terrestrial broadcast signal and the satellite broadcast signal, wherein delaying transmissions of the first and second terrestrial broadcast signals by the first and second delay values, respectively, allows a wireless communication device receiving the first terrestrial broadcast signal, the second terrestrial broadcast signal and the satellite broadcast signal to combine the first terrestrial broadcast signal, the second terrestrial broadcast signal, and the satellite broadcast signal to obtain an enhanced shared frequency received signal within the selected region of the coverage area.

11. The communication system of claim 10, wherein the measured signal quality factor is at least one quality measurement selected from at least one of a Signal to Interference plus Noise Ratio (SINR), a Signal to Interference Ratio (SIR), and a Signal to Noise Ratio (SNR).

12. A non-transitory computer-readable medium having stored thereon software instructions configured to cause a processor to perform operations comprising:

establishing a first delay value for a first terrestrial broadcast signal transmitted from a first terrestrial transmitter based upon a propagation delay of a satellite broadcast signal on a shared frequency between the first terrestrial transmitter and a broadcast satellite; and adjusting the first delay value of the first terrestrial broadcast signal for the first terrestrial broadcast signal based on a measured signal quality factor measured within a region of coverage area of the first terrestrial transmitter selected by measuring the signal quality factor to identify a region within a coverage area of the first terrestrial transmitter where a combination of signals from the first terrestrial transmitter and the broadcast satellite is most advantageous, wherein delaying transmissions of the first terrestrial broadcast signal from the first terrestrial transmitter by the first delay value allows a wireless communication device receiving the first terrestrial broadcast signal and the satellite broadcast signal to combine the first terrestrial broadcast signal and the satellite broadcast signal to obtain an enhanced shared frequency received signal within the selected region of the coverage area.

13. The non-transitory computer-readable medium of claim 12, wherein the stored software instructions are configured to cause the processor to perform operations further comprising:

establishing a second delay value for a second terrestrial broadcast signal transmitted from a second terrestrial transmitter based upon a propagation delay of the satellite broadcast signal on the shared frequency between the second terrestrial transmitter and a broadcast satellite;

adjusting the second delay value for the second terrestrial broadcast signal based on a synchronization between the second terrestrial broadcast signal, the first terrestrial broadcast signal and the satellite broadcast signal, wherein delaying transmissions of the second terrestrial broadcast signal from the second terrestrial transmitter by the second delay value allows the wireless communication device receiving the first terrestrial broadcast signal, the second terrestrial broadcast signal and the satellite broadcast signal to combine the first terrestrial broadcast signal, the second terrestrial broadcast signal, and the satellite broadcast signal to obtain the enhanced shared frequency received signal within the selected region of the coverage area.

14. The non-transitory computer-readable medium of claim 12, wherein the measured signal quality factor is at least one quality measurement selected from a Signal to Interference plus Noise Ratio (SINR), a Signal to Interference Ratio (SIR), and a Signal to Noise Ratio (SNR).

15. An apparatus for synchronizing common broadcasts from multiple transmitters, the apparatus comprising:

a delay adjustment circuit configured to:

establish a first delay value for a first terrestrial broadcast signal transmitted from a first terrestrial transmitter based upon a propagation delay of a satellite broadcast signal on a shared frequency between the first terrestrial transmitter and a broadcast satellite; and adjust the first delay value of the first terrestrial broadcast signal based on a based on a measured signal quality factor measured within a region of coverage area of the first terrestrial transmitter selected by measuring the signal quality factor to identify a region within a coverage area of the first terrestrial transmitter where a combination of signals from the first terrestrial transmitter and the broadcast satellite is most advantageous, wherein delaying transmissions of the first terrestrial broadcast signal from the first terrestrial transmitter by the first delay value allows a wireless communication device receiving the first terrestrial broadcast signal and the satellite broadcast signal to combine the first terrestrial broadcast signal and the satellite broadcast signal to obtain an enhanced shared frequency received signal within the selected region of the coverage area.

16. The apparatus of claim 15, wherein the measured signal quality factor is at least one quality measurement selected from a Signal to Interference plus Noise Ratio (SINR), a Signal to Interference Ratio (SIR), and a Signal to Noise Ratio (SNR).

* * * * *